US012752641B2

(12) United States Patent
Keller et al.

(10) Patent No.: US 12,752,641 B2
(45) Date of Patent: Oct. 6, 2026

(54) MOTOR VEHICLE HAVING A GAS CHANNEL BETWEEN A BATTERY SYSTEM AND AN UNDERRIDE PROTECTION PLATE

(71) Applicant: Dr. Ing. h.c. F. Porsche Aktiengesellschaft, Stuttgart (DE)

(72) Inventors: Ralf Keller, Pforzheim (DE); Gabriel Dilmac, Ludwigsburg (DE); Philipp Kellner, Renningen-Malmsheim (DE); Christopher Volkmer, Niefern-Öschelbronn (DE); Simon Frieß, Kuchen (DE); Salvatore Maltisotto, Stuttgart (DE); Sascha Mostofi, Stuttgart (DE); Frederik Roost, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 860 days.

(21) Appl. No.: 18/115,051

(22) Filed: Feb. 28, 2023

(65) Prior Publication Data

US 2023/0286396 A1 Sep. 14, 2023

(30) Foreign Application Priority Data

Mar. 9, 2022 (DE) ..................... 10 2022 105 511.6

(51) Int. Cl.

*B60L 50/64* (2019.01)
*B60L 58/26* (2019.01)
(Continued)

(52) U.S. Cl.

CPC ............... *B60L 50/64* (2019.02); *B60L 58/26* (2019.02); *B62D 29/002* (2013.01); (Continued)

(58) Field of Classification Search

CPC ....... B60L 50/64; B60L 58/26; B62D 29/002; B62D 25/2072; H01M 10/613; (Continued)

(56) References Cited

U.S. PATENT DOCUMENTS 11,005,138 B2 5/2021 Morioka
11,185,726 B2 * 11/2021 Lee ..................... H01M 10/486
(Continued)

FOREIGN PATENT DOCUMENTS

CA 3161363 A1 * 7/2021 .......... H01M 10/658
CA 3177761 A1 * 10/2022 .......... H01M 50/383
(Continued)

OTHER PUBLICATIONS

Japanese Notice of Reasons for Refusal for Japanese Application No. 2023-031708, dated Feb. 21, 2024, 1 pages.

*Primary Examiner* — Kaity V Chandler

(74) *Attorney, Agent, or Firm* — Buchanan Ingersoll & Rooney PC

(57) ABSTRACT

A motor vehicle, in particular with an electric drive, having a battery system and an underride protection plate. The underride protection plate is arranged in the motor vehicle at least in sections under the battery system. The battery system includes a battery module, which includes a first wall in a first region of the battery system and a second wall in a second region of the battery system. The underride protection plate is formed in such a way that the underride protection plate directly or indirectly abuts the battery system in the first region and in the second region at least in sections, and, between the first region and the second region, forms a first section of a gas channel between the battery system and the underride protection plate.

17 Claims, 3 Drawing Sheets

(51) Int. Cl.

| | |
|---|---|
| ***B62D 29/00*** | (2006.01) |
| ***H01M 10/613*** | (2014.01) |
| ***H01M 10/625*** | (2014.01) |
| ***H01M 10/6566*** | (2014.01) |
| ***H01M 50/249*** | (2021.01) |

(52) U.S. Cl.

CPC ....... *H01M 10/613* (2015.04); *H01M 10/625* (2015.04); *H01M 10/6566* (2015.04); *H01M 50/249* (2021.01); *H01M 2220/20* (2013.01)

(58) Field of Classification Search

CPC ........... H01M 10/625; H01M 10/6566; H01M 50/249; H01M 2220/20; H01M 50/207; H01M 50/367; B60K 2001/005; B60K 2001/0438; B60K 1/04; Y02E 60/10; B60Y 2200/91; Y02T 10/64; Y02T 10/70

See application file for complete search history.

(56) References Cited

U.S. PATENT DOCUMENTS

| | | | | |
|---|---|---|---|---|
| 2009/0142628 | A1 * | 6/2009 | Okada | H01M 10/052 429/8 |
| 2019/0355948 | A1 * | 11/2019 | Smith | B60K 1/04 |
| 2021/0313650 | A1 | 10/2021 | Gondoh | |

FOREIGN PATENT DOCUMENTS

| | | | | | |
|---|---|---|---|---|---|
| CN | 209993707 | U | * | 1/2020 | Y02E 60/10 |
| CN | 113067051 | A | * | 7/2021 | H01M 10/613 |
| CN | 114944519 | A | * | 8/2022 | H01M 10/627 |
| CN | 217903278 | U | * | 11/2022 | Y02E 60/10 |
| CN | 218101557 | U | * | 12/2022 | Y02E 60/10 |
| CN | 218101558 | U | * | 12/2022 | Y02E 60/10 |
| CN | 218513525 | U | * | 2/2023 | Y02E 60/10 |
| DE | 102018128016 | A1 | * | 5/2019 | H01M 50/264 |
| JP | 2003146252 | A | | 5/2003 | |
| JP | 2014159219 | A | | 9/2014 | |
| JP | 2018129251 | A | | 8/2018 | |
| JP | 2023016597 | A | * | 2/2023 | Y02E 60/10 |
| WO | 2020039722 | A1 | | 2/2020 | |
| WO | 2021053133 | A1 | | 3/2021 | |
| WO | 2021110246 | A1 | | 6/2021 | |

* cited by examiner

MOTOR VEHICLE HAVING A GAS CHANNEL BETWEEN A BATTERY SYSTEM AND AN UNDERRIDE PROTECTION PLATE

CROSS-REFERENCE TO RELATED APPLICATION

This application claims priority to German Patent Application No. 10 2022 105 511.6, filed Mar. 9, 2022, the content of such application being incorporated by reference herein in its entirety.

FIELD OF THE INVENTION

The invention relates to a motor vehicle having a gas channel between a battery system and an underride protection plate.

BACKGROUND OF THE INVENTION

WO 2021053133 A1, which is incorporated by reference herein, discloses an electric motor vehicle having an underride protection or otherwise bottom plate. This plate comprises support surfaces for a battery module arranged above it. A gas diversion channel is arranged in the plate. Walls of the gas channel are arranged so as to corresponding with walls of battery modules.

SUMMARY OF THE INVENTION

A motor vehicle according to aspects of the present invention, in particular with an electric drive, comprises a battery system and an underride protection plate, wherein the underride protection plate is arranged in the motor vehicle at least in sections under the battery system, wherein the battery system comprises a battery module, which comprises a first wall in a first region of the battery system and a second wall in a second region of the battery system, wherein the underride protection plate is formed in such a way that the underride protection plate directly or indirectly abuts the battery system in the first region and in the second region at least in sections, and between the first region and the second region, a first section of a gas channel is formed between the battery system and the underride protection plate. The walls provide an increased mechanical stability of the battery system in these regions. A gap between the underride protection plate and the battery system and between the regions in which the walls are arranged forms a gas channel. In the event of a load introduction from below into the underride protection plate, a force is thereby introduced into the walls of the battery module. The advantage of this arrangement is that the gas is conducted outside the battery system and can cool, wherein, in the event of a load introduction, the force is applied into the regions of increased mechanical stability of the battery system. This allows a high degree of freedom with regard to the shape of the gas channel and can be implemented without any additional design space requirements.

Preferably, the underride protection plate is formed in such a way that the underride protection plate forms a passage to a second section of the gas channel in a section of the first region and/or in a section of the second region, wherein the second section extends between the battery system and the underride protection plate substantially parallel adjacent to the first section of the gas channel and between two walls of a second battery module. The passage represents an interruption of the abutment regions of the underride protection plate on the battery system, through which these sections of the gas channel are connected to one another. Due to the fact that the gas flows past several battery modules, it is strongly cooled by the increased thermal mass of the further battery modules. This can more effectively prevent an ignition of the gas. At the same time, the abutment of the underride protection plate only achieves an optimum introduction of force into the battery system on the regions of the battery modules reinforced by the vertical walls and the protective effect of the battery system in cases of bollard loads.

Preferably, the underride protection plate is formed in such a way that the underride protection plate forms a gas channel that runs meanderingly under the battery system between the battery system and the underride protection plate. The thermal mass of the further battery modules makes the cooling even more efficient. This achieves a flame formation by targeted gas introduction in a significantly extended gas channel and an improvement of the cooling by thermally connecting the gas channel to several battery modules.

The battery system preferably comprises several battery modules, wherein the underride protection plate is shaped in such a way that the gas channel is formed under at least two of the battery modules. The heat capacity of several battery modules is thereby used in order to cool the gas.

The battery system preferably comprises at least one degassing opening that opens to the gas channel.

The gas channel preferably comprises, at at least one position, an opening for outflow of the gas into the environment or into further gas-conducting components.

The battery system preferably comprises several degassing openings, wherein the gas channel comprises several gas inlet openings respectively connected to one of the degassing openings of the battery system.

Preferably, the battery system comprises several degassing openings between the first wall and the second wall, wherein the first section comprises several gas inlet openings respectively connected to one of the degassing openings of the battery system.

The underride protection plate preferably comprises several layers, wherein a topmost of the layers facing the battery system has a shape that is configured at least in the first region and the second region for at least partially, direct or indirect, abutment with the battery system.

In one embodiment, the underride protection plate preferably comprises at least three layers, wherein two of the layers at least partially consist of a fiber composite material, and wherein, between these two layers, an intermediate layer is arranged, which at least partially consists of a compressible foam.

In one embodiment, the underride protection plate preferably consists at least partially of a metallic sheet construction.

The underride protection plate, at least in a passage between two sections of the gas channel, is also preferably formed so as to change a flow direction of gas in the gas channel, such that, upon a change, a centrifugal force acts on particles in the gas, whereby the particles are filtered out of the gas. By diverting the direction of flow between two sections of the gas channel, any particles in the gas are filtered out of the gas by the resulting centrifugal forces.

The underride protection plate preferably comprises a compressible material, in particular a non-woven or a foam, on its side facing the battery system in the first region and/or in the second region. This ensures an abutment on the battery system also in the case of tolerances.

BRIEF DESCRIPTION OF THE DRAWINGS

Further advantageous embodiments will emerge from the following description and the drawing. The drawing shows.

DETAILED DESCRIPTION OF THE INVENTION

Figure 1:
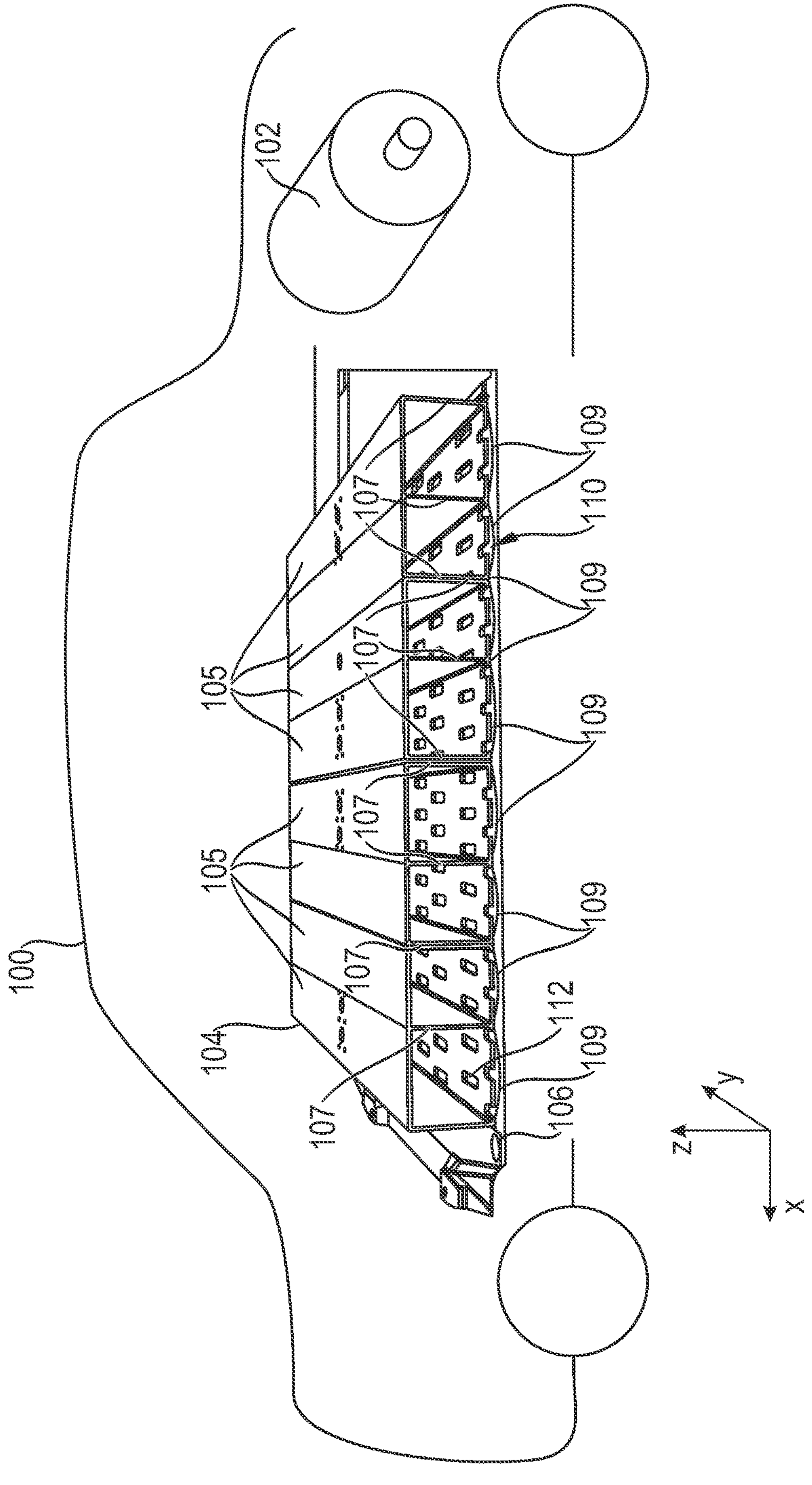
FIG. 1 a perspective view of a section of a motor vehicle.

In FIG. 1, a motor vehicle 100 with an electric drive 102 is shown in a perspective view.

The motor vehicle 100 comprises a battery system 104 having at least one battery module 105 and an underride protection plate 106.

The underride protection plate 106 is arranged in the motor vehicle 100 under the battery system 104, at least in sections. In the example, "below the battery system 104" means that the underride protection plate 106 extends in a z-direction beneath the motor vehicle 100, particularly between the battery system 104 and an underside of the motor vehicle 100 at least in sections in an x-direction and a y-direction corresponding to the underside.

In the example, eight battery modules 105 are shown, which are arranged in the z-direction above the underride protection plate 106 and extend in the x-direction side-by-side in the y-direction.

In the case of thermal events of cells in a battery module 105, a large amount of gas is produced, which needs to be conducted out of the cells and out of the battery system 104.

It is critical here that the gas, as long as it is hot, not be mixed with too much oxygen, because the oxygen promotes the ignition of the gas. At the same time, the gas should be cooled as much as possible before it is conducted into the environment, because the gas stops combusting at a lower temperature than a mixture of oxygen. Together with the gas, particles are typically ejected from the cell that promote the ignition of the gas and should therefore be filtered as far as possible out of the gas.

The gas could be conducted in order to be cooled in the battery system 104. However, because the gas is very hot and electrically conductive, this carries the risk of electrical insulation melting and, as a result, short circuits and arcs, i.e. high-energy, electrical flashbacks between the power bars in the battery system, which would be very difficult to manage in the battery system 104 with respect to stopping propagation thereof.

The motor vehicle according to aspects of the invention is therefore advantageously configured as follows.

A wall 107 is respectively arranged between the battery modules 105, each extending in the z-direction and y-direction.

That is to say, the battery system 104 comprises per battery module 105 a first wall 107 in a first region 108 of the battery system 104 and a second wall 107 in a second region 108 of the battery system 104. It can be provided that each battery module 105 comprises a first wall 107 and a second wall 107. It can be provided that two adjacent battery modules 105 comprise a common wall 107. The underride protection plate 106 is shaped in such a way that the underride protection plate 106 abuts in the first region 108 and in the second region 108 directly or indirectly at least in sections against the battery system 104.

Between the first region 108 and the second region 108, the underride protection plate 106 is shaped in such a way that the underride protection plate 106 forms a section 109 of a gas channel 110 between the battery system 104 and the underride protection plate 106 for each battery module 105. In these regions 108, the walls provide an increased mechanical stability of the battery system 104. A gap between the underride protection plate 106 and the battery system 104 and between the regions 108 in which the walls 107 are arranged forms the gas channel 110.

The battery system 104 comprises at least one degassing opening 112, through which gas can pass from the battery system 104 into the gas channel 110. In the example of FIG. 1, a degassing opening 112 is shown schematically, wherein several degassing openings 112 are provided per battery module 105. The battery system 104 comprises at least one degassing opening 112 that opens into the gas channel 110.

Figure 2:
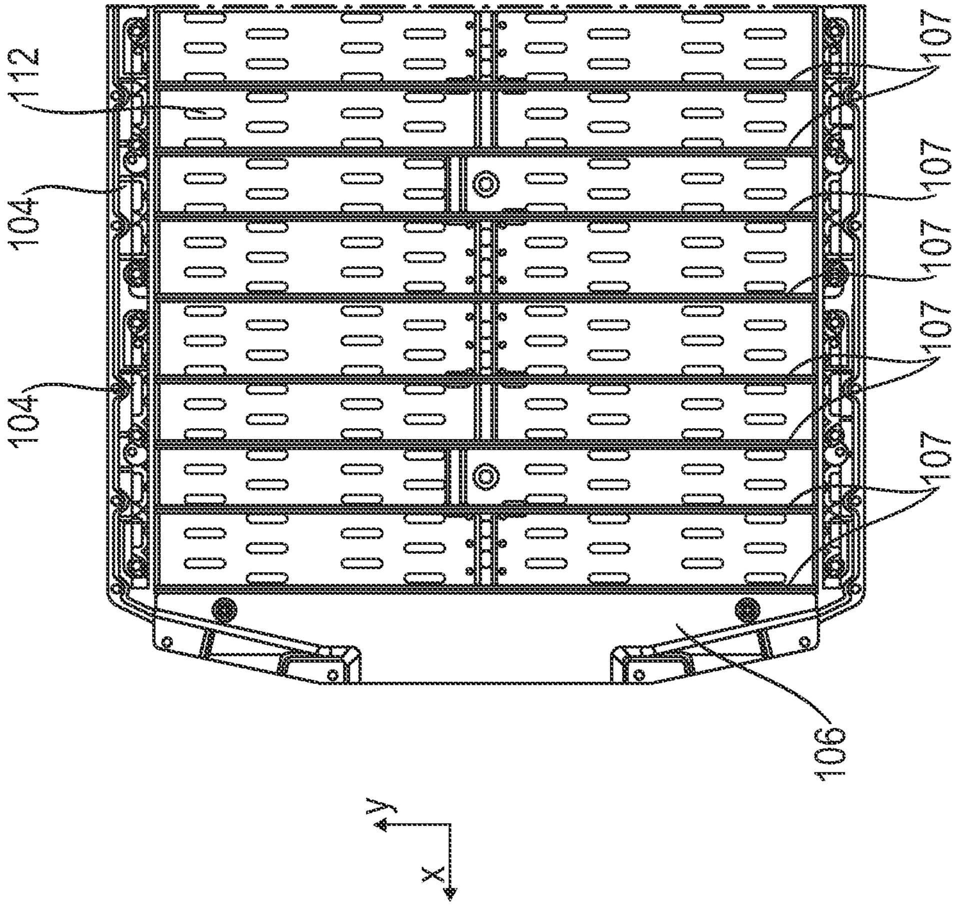
FIG. 2 a view of a battery module.

In FIG. 2, a view of the battery system 104 is shown. The battery system 104 is arranged on the underride protection plate 106. FIG. 2 shows an exemplary arrangement of the several degassing openings 112.

Figure 3:
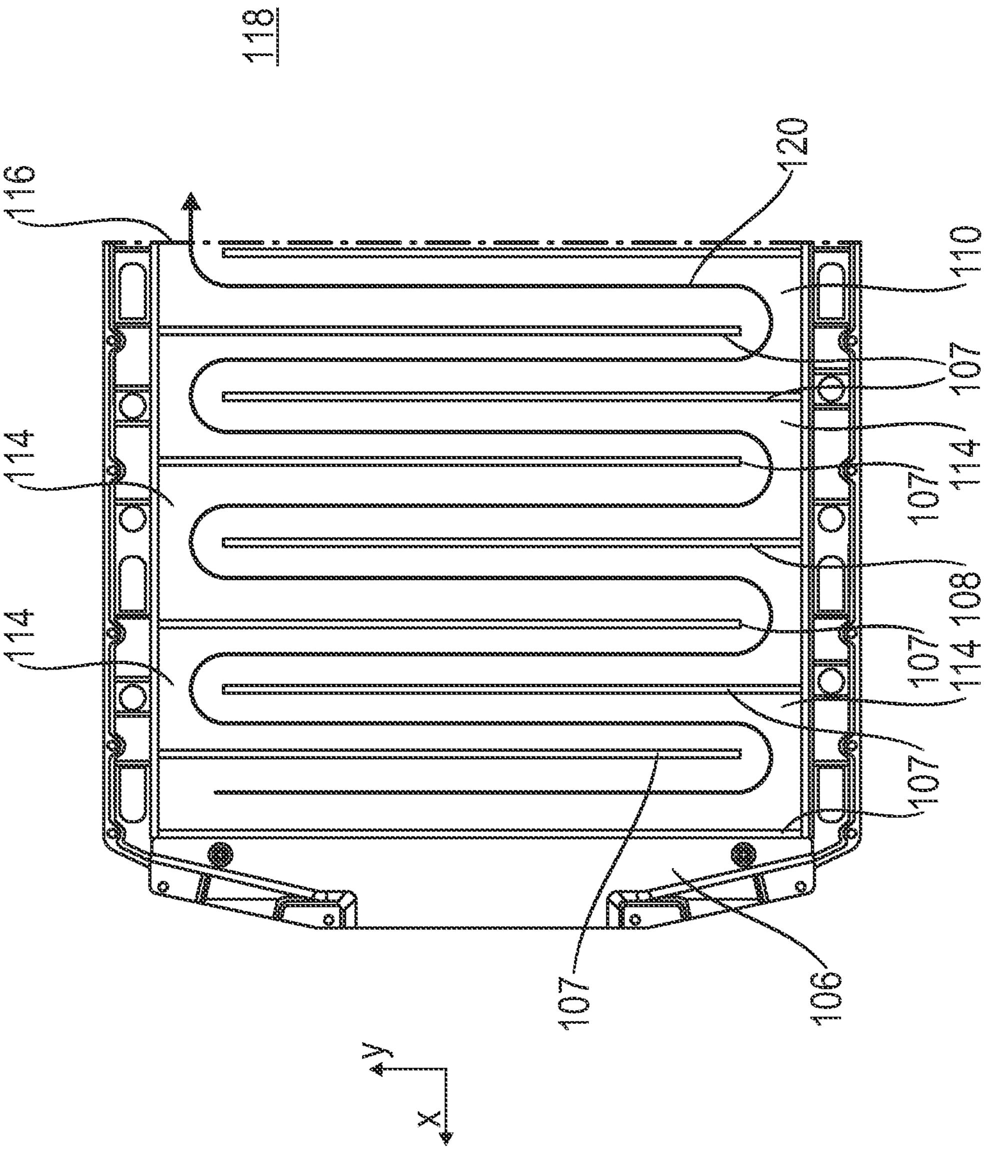
FIG. 3 a view of the underride protection plate.

In FIG. 3, a view of the underride protection plate 106 is shown.

In the event of a load introduction from below into the underride protection plate 106, a force is introduced into the walls 107 of the battery module 105. The gas is conducted in the gas channel 110 outside the battery system 104.

In the example, the underride protection plate 106 is formed in such a way that the underride protection plate 106 forms a passage to a second section 109 of the gas channel 110 in a section 114 of the first region 108 and/or in a section 114 of the second region 108. It can be provided that a respective opening is provided in each wall. Several openings can be provided in a wall. In the example, the openings are arranged in the walls of the same battery module 105 on opposite front faces of this battery module 105.

In the example, the second section 109 extends between the battery system 104 and the underride protection plate 106 substantially parallel to the first section 109 of the gas channel 110 and between two walls 107 of a second battery module 105.

The passage represents an interruption of the regions 108 of the underride protection plate 106 on the battery system 104, whereby these sections 109 of the gas channel 110 are interconnected. As a result, the gas flows past several battery modules 105.

In the example, the underride protection plate 106 is formed in such a way that the underride protection plate 106 forms the meandering gas channel 110 between the battery system 104 and the underride protection plate 106.

In the example, the gas channel 110 is formed under the eight battery modules 105. For other arrangements, the gas channel 110 can be formed under only one battery module 105 or under at least two of the battery modules 105.

In the example, at at least one position 116, the gas channel 110 comprises an opening for outflow of the gas into an environment 118 or into further gas-conducting components.

Battery system 104 can include several degassing openings 112, wherein the gas channel 110 comprises several gas inlet openings (not shown in the figures). These are, for example, respectively connected to one of the degassing openings 112 of the battery system 104.

In the example, the battery system 104 comprises several degassing openings 112 between the first wall 107 and the second wall 107. Per section 109, in the example, several gas inlet openings are arranged, which are respectively connected to one of the degassing openings 112 of the battery system 104.

The underride protection plate 106 can comprise several layers.

In the example, a topmost of the layers facing the battery system 104 has a shape that is configured per battery module 105 for direct or indirect abutment on the battery system 104, at least in sections, at least in the first region 108 and in the second region 108.

For example, the underride protection plate 106 comprises at least three layers, wherein two of the layers at least partially consist of a fiber composite material, and wherein, between these two layers, an intermediate layer is arranged, which at least partially consists of a compressible foam.

In a further example, the underride protection plate 106 at least partially consists of a metallic sheet construction.

The underride protection plate 106, at least in a passage between two sections 109 of the gas channel 110, can be formed so as to change a flow direction 120 of gas in the gas channel 110, such that, upon a change, a centrifugal force acts on particles in the gas, whereby the particles are filtered out of the gas. By diverting the flow direction 120 as it passes between two sections 109 of the gas channel 110, any particles in the gas are filtered out of the gas due to the resulting centrifugal forces.

The underride protection plate 106 can have, on its side facing the battery system 104, a compressible material, in particular a nonwoven or a foam, in the first region 108 and/or in the second region 108. As a result, an abutment on the battery module 105 is also ensured in case of tolerances.

What is claimed is:

1. A motor vehicle with an electric drive, said motor vehicle comprising:

a battery system including a battery module, a first wall in a first region of the battery system, and a second wall in a second region of the battery system, wherein the first wall and the second wall either form sidewalls of the battery module or are positioned beside the battery module; and an underride protection plate arranged in the motor vehicle at least in sections under the battery system, wherein a top surface of the underride protection plate is positioned to directly abut the battery system in the first region and in the second region, and wherein a first gap is disposed (i) between the first region and the second region and (ii) between the battery module and the top surface of the underride protection plate, wherein the first gap forms a first section of a gas channel;

wherein the underride protection plate forms a passage to a second section of the gas channel in a section of the first region and/or in a section of the second region, wherein the second section extends between the battery system and the underride protection plate substantially parallel adjacent to the first section of the gas channel and between two walls of a second battery module; and wherein the gas channel is formed by the underride protection plate between the battery system and the underride protection plate, wherein the gas channel extends meanderingly under the battery modules.

2. The motor vehicle according to claim 1, wherein the battery system comprises several battery modules, wherein the gas channel is disposed under at least two of the battery modules.

3. The motor vehicle according to claim 1, wherein the battery system comprises at least one degassing opening that opens into the gas channel.

4. The motor vehicle according to claim 1, wherein the gas channel comprises an opening at at least one position for outflow of gas into an environment outside of the motor vehicle or into further gas-conducting components.

5. The motor vehicle according to claim 1, wherein the battery system comprises a plurality of degassing openings, wherein the gas channel comprises a plurality of gas inlet openings respectively connected to one of the degassing openings of the battery system.

6. The motor vehicle according to claim 1, wherein the underride protection plate comprises a plurality of layers, wherein a topmost of the plurality of layers facing the battery system has a shape that is configured at least in the first region and the second region for at least partially, direct or indirect, abutment with the battery system.

7. The motor vehicle according to claim 1, wherein the underride protection plate comprises at least three layers, wherein two of the layers at least partially comprise a fiber composite material, and wherein, between the two layers, an intermediate layer is arranged, which at least partially comprises a compressible foam.

8. The motor vehicle according to claim 1, wherein the underride protection plate at least partially comprises a metallic sheet construction.

9. The motor vehicle according to claim 1, wherein the underride protection plate, at least in a passage between two sections of the gas channel, is configured to change a flow direction of gas in the gas channel, in such a way that, upon a change, a centrifugal force acts on particles in the gas, whereby the particles are filtered out of the gas.

10. The motor vehicle according to claim 1, wherein the underride protection plate comprises a compressible material on a side facing the battery system in the first region and/or in the second region.

11. The motor vehicle according to claim 10, wherein the compressible material is a non-woven or a foam.

12. The motor vehicle according to claim 1, wherein the top surface of the underride protection plate is positioned to directly abut the battery system at a location corresponding to the first wall and a location corresponding to the second wall.

13. The motor vehicle according to claim 1, wherein the top surface of the underride protection plate is positioned to directly abut the battery system at the first wall and the second wall.

14. The motor vehicle according to claim 1, wherein the top surface of the underride protection plate has a concavity that is positioned beneath the battery module, wherein the concavity forms a boundary of the gas channel.

15. The motor vehicle according to claim 14, wherein the battery module has a bottom wall interconnecting the first and second walls, wherein the bottom wall has degassing openings formed therein that fluidly communication with the gas channel.

16. The motor vehicle according to claim 1, wherein the first wall is positioned between the battery module and a first adjacent battery module and the second wall is positioned between the battery module and a second adjacent battery module.

17. The motor vehicle according to claim 16, wherein the first wall and the second wall are staggered such that a meandering path for the gas channel is established between the walls.

* * * * *